Patented Nov. 24, 1953

2,660,541

UNITED STATES PATENT OFFICE 2,660,541

METHOD OF TREATING WATER SOLUBLE SALT TO DECREASE CAKING AND RATE OF LEACHING BY GROUND WATER

William H. Rinkenbach, Rockaway, N. J., assignor of one-half to Trojan Powder Company, a corporation of New York No Drawing. Application September 6, 1950, Serial No. 183,473

5 Claims. (Cl. 117—100)

This invention relates to non-caking granules of water soluble material and the method of making them.

The invention is particularly useful in treating fertilizer salts such as ammonium nitrate and will be first illustrated by description in connection with such use.

Ammonium nitrate has been used extensively and for some time as an explosive and as a fertilizer. Various expedients have been proposed, some of them reasonably successful, for decreasing caking of the granules to one another in storage or during use. U. S. Patent 1,932,434 issued to Joseph A. Wyler on October 31, 1933, and entitled "Chemical Salts" describes one procedure for preventing caking of such granules. Melted paraffin wax and admixed diatomaceous earth have been proposed.

I have discovered a method and composition that solves the problem of caking in a new, economical, and effective manner. My invention provides a protecting film extending over granules of soluble fertilizer salts, the film permitting solution of the soluble salt, as by dialysis through the film, at a moderated rate that decreases the undesirably rapid leaching of the salt by ground water in seasons of excessive rainfall.

Briefly stated, my invention comprises the herein described method of and composition resulting from forming a protecting film of aluminum silicate or like difficultly soluble or insoluble multivalent metal silicate over granules of a water soluble material of which ammonium nitrate is the preferred example.

The method, in general, is mixing the granules to be protected with an aqueous solution of an alkali metal silicate containing a suspended multivalent metal compound, distributing the solution and suspension over the granules, and causing reaction, to form a protecting film.

As the material to be protected, there may be used granules of any water soluble material to be protected from caking or from absorbing moisture, as, for instance, ammonium nitrate, potassium nitrate, sodium nitrate, or strontium nitrate.

The granules may be of any size that is usual in the use intended. Examples are granules of size 5 to 30 mesh.

As the multivalent metal which is to be combined finally in the difficultly soluble or insoluble silicate protecting film, I use a multivalent metal whose silicate is substantially insoluble in water but in the form of a thin film is penetrable to water and aqueous solutions.

The multivalent metal compound selected must be used in the form of a compound that is practically insoluble in and non-reactive to an aqueous solution of alkali metal silicate, in the short time of contact of the two in the cold before application to the soluble granules to be protected. The said compound must be reactive with the silicate solution when warmed. Aluminum oxide is the preferred compound for this purpose.

The silicate used may be any alkali metal silicate in aqueous solution. There is no advantage in using any other than sodium silicate that offsets the lower cost of the latter. I use, therefore, any one of the sodium silicate or water glass solutions of commerce.

As to proportions, I obtain the best results when the multivalent metal compound is used in proportion at least approximately equivalent chemically to the alkali metal silicate. With the equivalent proportion or a large excess of the aluminum or of other multivalent metal compound, the silicate is largely converted to silicate other than the original alkali metal silicate. The new silicate in my final product is insoluble in water and non-tacky in contact with atmospheric moisture.

The total mixture of alkali metal silicate and multivalent metal compound for best results is used in the proportion of 0.5 to 5 parts on the dry basis for 100 parts dry weight of granules of ammonium nitrate or other salt to be protected.

The multivalent compound is used in finely divided form so as to present a large area of total surface for reacting with the silica. Thus hydrated aluminum oxide such as bauxite or precipitated dried aluminum hydroxide may be used in powdered form, as in comminuted state passing largely through 100 to 325 mesh.

In the treatment, a suspension is made of the aluminum oxide powder or other selected multivalent metal compound in the aqueous solution of sodium silicate. The suspension so made is fluid and remains so during the application to the granules of the water soluble material to be protected.

The suspension is then distributed over the granules, as by spraying, and the uniform distribution is improved by mixing the whole, as by a slow speed agitator. The silicate solution is so viscous that it does not penetrate rapidly the granules of water soluble material. It does not give localized overwetting when the granules are kept in motion. It does eventually penetrate partly into surface portions of the granules. The suspended multivalent compound does not so penetrate. As a result, the multivalent metal component is in excess on the surface of the granules.

The mixture is maintained at an elevated temperature and the mixing continued until the reaction between the silicate and heavy metal compound is completed and the product made commercially dry. Temperatures of 100° to 130° C. are satisfactory.

When the reaction is completed, the mass is cooled and the movement of the thus coated granules is continued as by the mixing operation, until the temperature falls below that at which any stickiness or tackiness of the protective film disappears. Thus the mass is cooled to 50° to 88° C. or even to room temperature before the agitation is stopped.

In this treatment, a glassy film is formed over the said granules. It is considered that the mechanism of the reaction is the reaction to give a substantially insoluble reaction product, such as aluminum silicate (including basic silicate or sodium aluminum silicate) or like silicate of other multivalent metal used. At the elevated temperature, water added in the silicate solution is driven off by evaporation, to leave the granules with the protecting coating in commercially dry condition, as low as 1% water content.

This coating prevents intercrystallization or solidification of the individual particles of ammonium nitrate or like soluble granules used originally. It also decreases the accessibility of the granules to water. The film, however, is semi-permeable and permits the passage therethrough of water and aqueous solutions (of crystalloids). This means that granules of ammonium nitrate or the like coated by my method and exposed as fertilizer salts to ground water, eventually pass into solution.

The invention will be further illustrated by description in connection with the following specific example of the practice of it.

I take 2000 lbs. of ammonium nitrate which has been produced by cooling in a grainer, with stirring, a highly concentrated solution of ammonium nitrate so that the temperature has decreased to not more than 130° C. and not less than 105° C. To this I add the coating material. This is accomplished by the spray application, with continued stirring of the slightly damp nitrate, of 17 to 120 lbs. of a solution consisting of:

| | Per cent by weight |
|---|---|
| Hydrated aluminum oxide (ground to pass 95% through a No. 325 sieve) | 37 |
| 40° Baumé sodium silicate | 58 |
| Water | 4 |

The suspension of the oxide in the silicate solution is added at such a rate that addition is complete by the time the temperature of the nitrate has fallen to 100° C. Agitation of the mass of nitrate crystals is continued until the temperature has decreased to at least 88° C. and preferably to approximately 60° C.

The product obtained is a pulverulent mass which differs greatly from ordinary ammonium nitrate in its resistance to caking when subjected to storage and particularly under conditions where the nitrate is exposed to moisture. This is accomplished by virtue of the reaction of the hydrous aluminum oxide and sodium silicate on the surface of the grains of ammonium nitrate at the elevated temperatures mentioned. This reaction results in the formation of a vitreous, water-insoluble material which coats the crystals or granules of ammonium nitrate. The coating so produced retards the absorption of moisture by the nitrate and prevents the welding together of the crystals or granules as a result of changes in crystal habit which take place under certain conditions of storage even when moisture is absent.

By varying the quantity of coating agent within the limit set forth above the rate of solution of the nitrate by the leaching action of rain or ground water can be varied considerably. Consequently, if nitrate so coated is used as a fertilizer or an ingredient of a fertilizer, the fertilizer is made available to root systems over a longer period of time and not suddenly and completely as would be the case with uncoated nitrate.

It will be understood that it is intended to cover all changes and modifications of the example of the invention herein chosen for the purpose of illustration which do not constitute departures from the spirit and scope of the invention.

What I claim is:

1. In treating a water soluble salt to decrease caking before use and rate of leaching by ground water, the method which comprises applying to the salt in the form of granules an aqueous solution of an alkali metal silicate and a suspension therein of aluminum oxide powder, mixing the granules of the salt and applied solution and suspension, so that the granules are kept in motion, the applied materials are distributed over the surface of the granules, the suspended aluminum oxide powder remains on the said surface, and the silicate solution enters surface portions of the granules, and maintaining the mixed materials in motion and at an elevated temperature until the silicate and aluminum oxide have reacted to form a protecting film over the individual granules of the said soluble salt.

2. The method described in claim 1, the proportion of aluminum oxide used being at least approximately chemically equivalent to the sodium silicate and the weight of the said suspension and aqueous solution being about 0.5 to 5 parts on the dry basis for 100 of the granules.

3. The method described in claim 1, the proportion of aluminum oxide used being at least approximately chemically equivalent to the sodium silicate and the weight of the said suspension and aqueous solution being about 0.5 to 5 parts on the dry basis for 100 of the granules, the whole being maintained at a temperature of about 100° to 130° C. and the granules in motion until the reaction is completed and the granules and film thereover are reduced in moisture content to commercially dry condition, and the mixture being then cooled and the granules maintained in motion until the temperature falls below that at which the film on the granules is tacky.

4. In treating granules of ammonium nitrate, the method which comprises applying to the granules a suspension of hydrated aluminum oxide powder in an aqueous solution of sodium silicate, mixing the granules with the applied suspension, and maintaining the granules and applied suspension in motion and at an elevated temperature until the aluminum oxide and silicate have reacted to form aluminum silicate as a protecting film over the individual granules of the ammonium nitrate.

5. The method described in claim 4, the proportion of aluminum oxide used being at least approximately chemically equivalent to the sodium silicate and the weight of the said suspension and aqueous solution being about 0.5 to 5 parts on the dry basis for 100 of the granules and the whole being maintained at an elevated temperature and the granules in motion until the reaction is completed and the granules and film thereover are reduced in moisture content to commercially dry condition.

WILLIAM H. RINKENBACH.

References Cited in the file of this patent

UNITED STATES PATENTS

| Number | Name | Date |
| --- | --- | --- |
| 1,135,387 | Messerschmitt | Apr. 13, 1915 |
| 1,932,434 | Wyler | Oct. 31, 1933 |
| 2,399,987 | Cordie et al. | May 7, 1946 |
| 2,407,151 | Glogau | Sept. 3, 1946 |

FOREIGN PATENTS

| Number | Country | Date |
| --- | --- | --- |
| 425,326 | Great Britain | Mar. 12, 1935 |
| 426,472 | Great Britain | Apr. 1, 1935 |